United States Patent
Gomyo et al.

(10) Patent No.: US 11,372,712 B2
(45) Date of Patent: Jun. 28, 2022

(54) PROCESSING DEVICE AND METHOD OF CONTROLLING PROCESSING DEVICE

(71) Applicant: FUJITSU LIMITED, Kawasaki (JP)

(72) Inventors: Norihito Gomyo, Tama (JP); Ryohei Okazaki, Kawasaki (JP); Yasunobu Akizuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 415 days.

(21) Appl. No.: 16/680,572

(22) Filed: Nov. 12, 2019

(65) Prior Publication Data

US 2020/0167226 A1 May 28, 2020

(30) Foreign Application Priority Data

Nov. 26, 2018 (JP) ............................ JP2018-220092

(51) Int. Cl.
*G06F 11/07* (2006.01)
*G06F 9/38* (2018.01)
(Continued)

(52) U.S. Cl.
CPC ...... *G06F 11/0793* (2013.01); *G06F 9/30134* (2013.01); *G06F 9/30145* (2013.01);
(Continued)

(58) Field of Classification Search
CPC ............. G06F 11/0793; G06F 9/30134; G06F 9/30145; G06F 9/3861; G06F 9/5027; G06F 11/0772; G06F 11/1405
(Continued)

(56) References Cited

U.S. PATENT DOCUMENTS

2010/0088544 A1 4/2010 Gomyo et al.
2015/0100960 A1* 4/2015 Shigeta ................. G06F 9/5088
718/1

FOREIGN PATENT DOCUMENTS

JP 57-164342 A 10/1982
JP 61-32701 B2 7/1986
(Continued)

OTHER PUBLICATIONS

Wikipedia "Exception handling" page from date Nov. 23, 2018, retrieved from https://web.archive.org/web/20181123054846/https://en.wikipedia.org/wiki/Exception_handling (Year: 2018).*
(Continued)

*Primary Examiner* — Yair Leibovich
(74) *Attorney, Agent, or Firm* — Fujitsu Patent Center

(57) ABSTRACT

A processing device performs a first process in a plurality of cycles to update a plurality of resources included in programmable resources. The processing device includes an instruction execution circuit that records that the first process is being executed, and makes an error notification when an error is detected during execution of an instruction, and a retry control circuit that records a type of the first process at a starting point of the first process, judges from the recorded type whether the first process is re-executable upon receiving the error notification during the first process, and instructs re-execution of the first process from a start of the first process in a case where the first process is judged to be re-executable. The instruction execution circuit performs a retry process to re-execute the first process when instructed from the retry control circuit to re-execute the first process.

13 Claims, 9 Drawing Sheets

(51) Int. Cl.
*G06F 9/50* (2006.01)
*G06F 9/30* (2018.01)

(52) U.S. Cl.
CPC .......... *G06F 9/3861* (2013.01); *G06F 9/5027* (2013.01); *G06F 11/0772* (2013.01)

(58) Field of Classification Search
USPC ........................................................ 714/48
See application file for complete search history.

(56) References Cited

FOREIGN PATENT DOCUMENTS

| | | |
|---|---|---|
| JP | 11-327940 A | 11/1999 |
| WO | 2008/155803 A1 | 12/2008 |

OTHER PUBLICATIONS

Wikipedia "CPU" page, retrieved from https://en.wikipedia.org/wiki/Central_processing_unit (Year: 2022).*

* cited by examiner

FIG.7

|  | EXCEPTION GENERATED | PROCEDURE ST1 | PROCEDURE ST2 | PROCEDURE ST3 |
|---|---|---|---|---|
| PSTATE | A | A | A | X |
| SPSR_EL1 | B | A | A | A |
| PC | C | C | C | Y |
| ELR_EL1 | D | C | C | C |
| SP | E | E | E | G |
| SP_EL0 | F | F | E | E |
| SP_EL1 | G | G | G | G |
|  |  |  |  |  |
| HARDOP_RETRY_POINT | 0 | 1 | 1 | 0 |

FIG.8

|  | START eret INSTRUCTION | PROCEDURE ST11 | PROCEDURE ST12 | PROCEDURE ST13 |
|---|---|---|---|---|
| PSTATE | A | B | B | B |
| SPSR_EL1 | B | B | B | B |
| PC | C | D | D | D |
| ELR_EL1 | D | D | D | D |
| SP | E | E | E | F |
| SP_EL0 | F | F | F | F |
| SP_EL1 | G | G | E | E |
|  |  |  |  |  |
| HARDOP_RETRY_POINT | 0 | 1 | 1 | 0 |

FIG.9

|  | START spsel UPDATE INSTRUCTION | PROCEDURE ST21 | PROCEDURE ST22 | PROCEDURE ST23 |
|---|---|---|---|---|
| spsel | 1 | 0 | 0 | 0 |
| PC | A | A+4 | A+4 | A+4 |
| SP | B | B | B | C |
| SP_EL0 | C | C | C | C |
| SP_EL1 | D | D | B | B |
| HARDOP_RETRY_POINT | 0 | 1 | 1 | 0 |

PROCESSING DEVICE AND METHOD OF CONTROLLING PROCESSING DEVICE

CROSS-REFERENCE TO RELATED APPLICATIONS

This application is based upon and claims the benefit of priority of the prior Japanese Patent Application No. 2018-220092, filed on Nov. 26, 2018, the entire contents of which are incorporated herein by reference.

FIELD

The embodiments discussed herein are related to a processing device, and a method of controlling the processing device.

The processing device is sometimes also referred to as a processor, an arithmetic processing unit, or the like.

BACKGROUND

In the processing device, such as the processor, that places emphasis on the reliability, a retry process is performed when an error is detected during execution of an instruction, to re-execute, by hardware, the instruction that was being processed upon detection of the error. Such a retry process is described in International Publication Pamphlet No. WO2008/155803, for example.

When the following errors are detected during execution of the instruction, the execution of the instruction can be continued by performing the retry process, without causing an abnormal end of a program.

There are errors that are generated when states inside the hardware temporarily change due to alpha rays or the like. Such errors are not caused by failure of the hardware itself. For this reason, the possibility of generating such errors again is low when the instruction is re-executed, and such errors are almost surely recovered by the retry process.

On the other hand, there are errors that are generated due to noise from proximity wirings inside the hardware. For example, in a case where a signal line inside the processing device is failing due to electromigration or the like, errors may be generated depending on states of signal lines in proximities of the signal line inside the processing device. The possibility of recovering such errors by the retry process is high, because by re-executing only a single instruction, the probability that the proximity wirings will vary at the time of the re-execution is greatly reduced.

However, in conventional retry control circuits are designed not to perform the retry process in a case where an error notification is received during a time between updating the resources and completing the instruction. Such a design is employed because there is no guarantee that the same result will be obtained when the instruction is re-executed after updating the resources.

An exception process is one of processes for which the retry process described above cannot be performed. Contents of the exception process differ depending on the instruction set architecture, however, in general, require updating a plurality of resources. Further, because the exception process is generated at a relatively low frequency, the updating of the resources is performed over a plurality of cycles. For these reasons, in a case where the error is generated during the exception process, that is, during a time between the start and the end of the exception process, conventional processing devices cannot perform the retry process according to the exception process. Similarly, in a case where the error is generated during an exception return process, the conventional processing devices cannot perform the retry process according to the exception return process. In addition, in a case where the error is generated during an update process that updates a selection value of a stack pointer, the conventional processing devices cannot perform the retry process according to the update process of the selection value of the stack pointer.

Accordingly, in the case where the error is generated during a special process, such as the exception process, the exception return process, the update process of the selection value of the stack pointer, or the like, the conventional processing devices cannot perform the retry process according to the type of special process.

For example, Japanese Laid-Open Patent Publication No. 57-164342 describes a method of controlling a retry process, and Japanese Laid-Open Patent Publication No. 11-327940 describes a method of controlling re-execution of the instruction.

As described above, the conventional processing devices cannot perform the retry process according to the type of special process in the case where the error is detected during the special process.

SUMMARY

Accordingly, it is an object in one aspect of the embodiments to provide a processing device, and a method of controlling the processing device, which can perform a retry process according to the type of special process in a case where an error is detected during the special process.

According to one aspect of the embodiments, a processing device that performs a special process in a plurality of cycles to update a plurality of resources included in programmable resources, includes an instruction execution circuit configured to record that the first process is being executed, and to make an error notification when an error is detected during execution of an instruction; and a retry control circuit configured to record a type of the first process at a starting point of the first process, judge from the recorded type whether the first process is re-executable upon receiving the error notification during the first process, and instruct re-execution of the first process from a start of the first process in a case where the first process is judged to be re-executable, wherein the instruction execution circuit performs a retry process to re-execute the first process when instructed from the retry control circuit to re-execute the first process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram for explaining an example of an operation of an exception process;

FIG. 8 is a diagram for explaining an example of an operation of an exception return process; and FIG. 9 is a diagram for explaining an example of an operation of a spsel update process.

DESCRIPTION OF EMBODIMENTS

Preferred embodiments of the present invention will be described with reference to the accompanying drawings.

A description will be given of a processing device, and a method of controlling the processing device, according to each embodiment.

In the processing device, contents of an exception process differ depending on the instruction set architecture, however, in general, the contents require updating a plurality of resources by 1 instruction. On the other hand, because the exception process is generated at a relatively low frequency, the updating of the resources is performed over a plurality of cycles.

For example, in the exception process for a case where an ARMv8-A architecture by ARM Holdings plc is employed, access to a spsel register is made at exception levels higher than EL1, and a value of a flag of a stack pointer is set to switch the stack used. The flag of the stack pointer is stored in a process state register (hereinafter also referred to as a "PSTATE register"), which is a collection of flags representing execution states of the processing device. An update process to update a selection value of the stack pointer includes a spsel update process or the like.

In a case where an error is detected after starting the exception process, during a time between updating the resources and completing the instruction, there is no guarantee that the same result will be obtained when the instruction is re-executed after updating the resources. For this reason, a retry process of the exception process is conventionally not performed.

According to the disclosed processing device and method of controlling the processing device, a special process that updates a plurality of resources is performed in a plurality of cycles. An instruction execution circuit records that the special process is being performed, and makes an error notification when an error is detected during execution of an instruction. A retry control circuit records the special process type at a starting point of the special process, and in a case where the error notification is received during the special process, judges from the recorded special process type whether the special process is re-executable. In a case where the retry control circuit judges that the special process is re-executable, the retry control circuit instructs re-execution of the special process from the start of the special process. The instruction execution circuit performs a retry process to re-execute the special process, based on the special process re-execution instruction from the retry control circuit.

Figure 1:
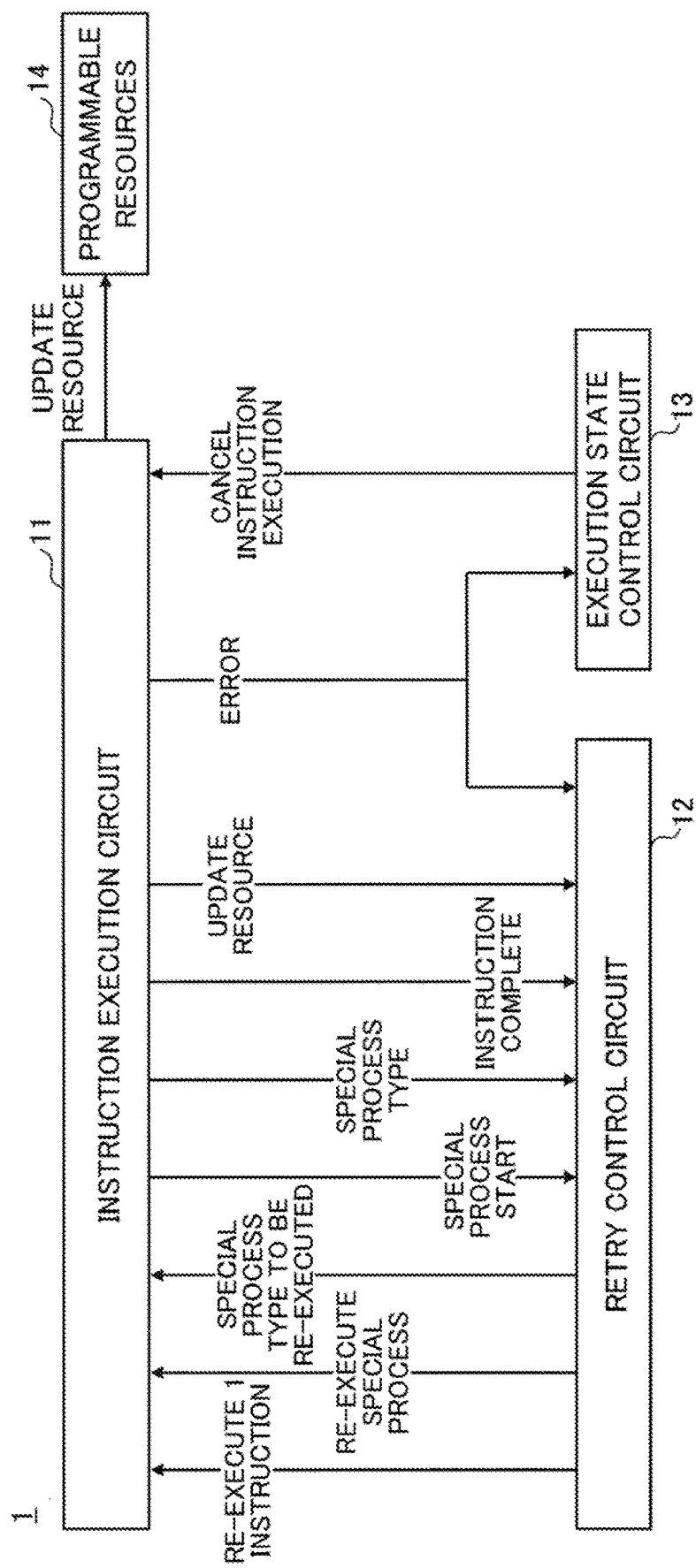
FIG. 1 is a block diagram illustrating an example of a configuration of a processing device according to one embodiment.

FIG. 1 is a block diagram illustrating an example of a configuration of a processing device according to one embodiment. A processing device 1 illustrated in FIG. 1 executes a special process, such as the exception process, an exception return process, the update process of the selection value of the stack pointer, or the like, in a plurality of cycles. As will be described later, in a case where the error is detected during the special process, the processing device 1 judges, from a special process type, whether the special process is re-executable. When the processing device 1 judges that the special process is re-executable, the retry process is performed to re-execute the special process from the start.

The processing device illustrated in FIG. 1 includes an instruction execution circuit 11, a retry control circuit 12, an execution state control circuit 13, and programmable resources 14.

The instruction execution circuit 11 includes a circuit that performs an instruction fetch, a circuit that performs an instruction decode, a circuit that performs an operation execute, a circuit that performs an instruction complete, a circuit that instructs, in order (or "in-order"), a resource update of the programmable resources 14, or the like. In addition, the instruction execution circuit 11 includes a circuit that executes the special process described above, a circuit that detects the error during execution of the instruction, or the like. Known circuits may be used for these circuits included in the instruction execution circuit 11.

The retry control circuit 12 includes a circuit that judges whether a timing is the timing at which the retry process can be performed, a circuit that stores a flag indicating that performing the retry process is definite, a circuit that instructs re-execution of 1 instruction with respect to the instruction execution circuit 11, or the like. Known circuits may be used for these circuits included in the retry control circuit 12.

The execution state control circuit 13 includes a circuit or the like that instructs to cancel instruction execution with respect to the instruction execution circuit 11 upon receiving an error notification from the instruction execution circuit 11. Known circuits may be used for the circuits included in the execution state control circuit 13.

The instruction execution circuit 11 makes the error notification to the retry control circuit 12 and the execution state control circuit 13 upon detection of the error. The circuit that detects the error during execution of the instruction is provided at various parts of the instruction execution circuit 11, where required. In order to avoid the updating of the resources using erroneous data, the execution state control circuit 13 makes a transition to an instruction execution cancelled state immediately upon receiving the error notification, and instructs the instruction execution circuit 11 to cancel instruction execution. On the other hand, the retry control circuit 12 sets the flag indicating that performing the retry process is definite, upon receiving the error notification at the timing when the retry process can be performed, and instructs execution of 1 instruction to the instruction execution circuit 11.

When instructed from the execution state control circuit 13 to cancel instruction execution, the instruction execution circuit 11 cancels the resource update of the programmable resources 14, and clears all processes within the instruction execution circuit 11. When the instruction from the execution state control circuit 13 to cancel instruction execution is rescinded, the instruction execution circuit 11 executes only 1 instruction according to the instruction from the retry control circuit 12 to execute 1 instruction. When the execution of 1 instruction is completed, the instruction execution circuit 11 notifies an instruction complete to the retry control circuit 12. The retry control circuit 12 resets the flag indicating that performing the retry process is definite, upon receiving the instruction complete notification from the instruction execution circuit 11, and rescinds the instruction to execute 1 instruction output to the instruction execution circuit 11. The instruction execution circuit 11 returns to the process of the instruction other than the special process, upon rescinding of the instruction to execute 1 instruction.

The instruction execution circuit 11 notifies the instruction complete and the resource update to the retry control circuit 12. In the case of an instruction that updates only one of the programmable resources 14, the resource update and the instruction complete are notified at the same timing. The retry control circuit 12 judges that the timing at which the instruction that updates only 1 resource is executed is the timing when the retry process can be performed. On the other hand, in the case of an instruction that updates a plurality of resources of the programmable resources 14 over a plurality of cycles, the resource update and the instruction complete are notified at different timings. Conventionally, in the case of the instruction that updates the plurality of resources, the timing after the resource update until immediately before the instruction complete is judged as the timing when the retry process cannot be performed. However, according to this embodiment, in the case of the instruction that updates the plurality of resources, the retry control circuit 12 judges that the retry process can be performed under a predetermined condition which will be described later, even at the timing after the resource update until immediately before the instruction complete.

In this embodiment, the instruction execution circuit 11 further includes a circuit that records the special process being executed. The instruction execution circuit 11 notifies a special process start and the special process type to the retry control circuit 12, at a starting point of the special process (hereinafter also referred to as a "special process starting point"), such as the exception process or the like. The special process type indicates the type of the special process, such as the exception process, the exception return process, the spsel update process, or the like. In addition, the instruction execution circuit 11 notifies a special process complete to the retry control circuit 12 using the same instruction complete as the instructions of processes other than the special process. The instruction execution circuit 11 makes the error notification to the retry control circuit 12 and the execution state control circuit 13, upon detection of the error during the special process. Furthermore, the instruction execution circuit 11 performs the resource update of the programmable resources 14, according to re-execution of the special process due to the error detected during execution of the special process.

In this embodiment, the retry control circuit 12 further includes a circuit or the like that records the special process type notified at the special process starting point. In addition, the retry control circuit 12 includes a circuit that instructs the recorded special process type and re-execution of the special process, in a case where the error notification from the instruction execution circuit 11 is received during the special process from the special process start until the special process complete. More particularly, the retry control circuit 12 judges from the recorded special process type whether the special process is re-executable, and in a case where the special process is judged to be re-executable, the retry control circuit 12 instructs the instruction execution circuit 11 to re-execute the special process of the recorded special process type from the start. Based on the instruction from the retry control circuit 12 to re-execute the special process, the instruction execution circuit 11 executes the special process, such as the exception process, the exception return process, the spsel update process, or the like in a re-executable order.

As will be described later in conjunction with FIG. 5, the retry control circuit 12 includes a HARDOP_RETRY_POINT register that stores the flag used to judge whether the timing is the timing at which the special process is re-executable, is set at the timing of the special process start, and is reset at the timing of the special process complete. The retry control circuit 12 further includes a HARDOP_RETRY_TGR register that stores the flag indicating that performing the retry process of the special process is definite and the retry process of the special process is not completed. The HARDOP_RETRY_TGR register is set in a case where the HARDOP_RETRY_POINT register is set at the error detection timing, and the condition for resetting the HARDOP_RETRY_POINT register is satisfied, and is reset at the timing of the special process complete. The HARDOP_RETRY_TGR register instructs re-execute special process to the instruction execution circuit 11. In addition, the retry control circuit 12 includes a first recording circuit that records the special process type notified at the special process starting point. This first recording circuit sets the HARDOP_RETRY_TGR register only in a case where the special process recorded at the error detection timing is a re-executable process, and notifies the special process type to be re-executed, to the instruction execution circuit 11 when re-executing the special process.

Accordingly, the retry process according to the special process type can be performed in the case where the error is detected during the special process, such as the exception process, the exception return process, the spsel update process, or the like. Moreover, in the case where the error is detected during the special process, the execution of the instruction can be continued by performing the retry process, without causing an abnormal end of the program, as long as the special process type is re-executable. As a result, it is possible to improve the reliability of the processing device 1.

Figure 2:
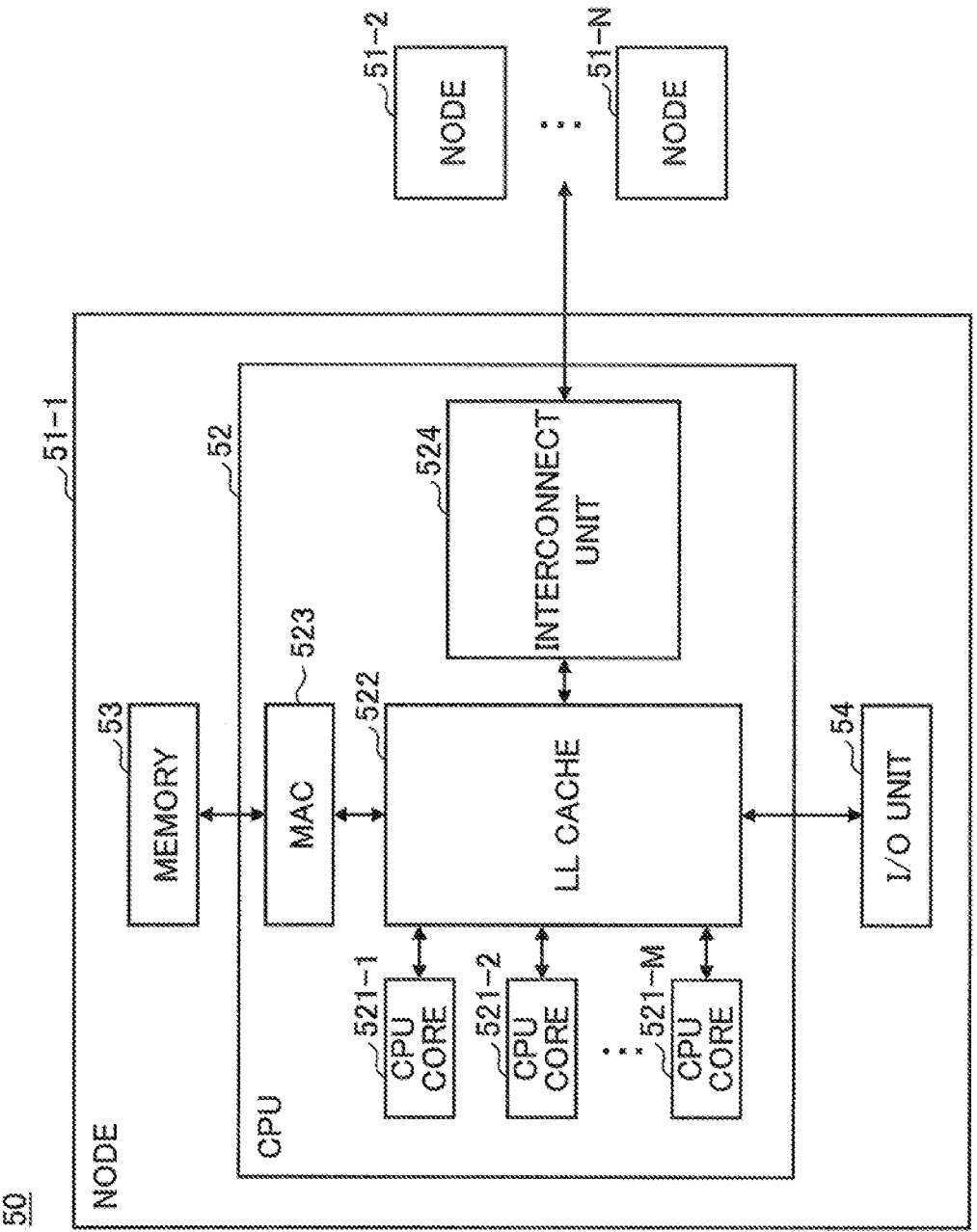
FIG. 2 is a block diagram illustrating an example of a processing system having a multi-core structure according to one embodiment.

FIG. 2 is a block diagram illustrating an example of a processing system having a multi-core structure according to one embodiment. A processing system 50 illustrated in FIG. 2 includes a plurality of nodes 51-1 through 51-N, where N is a natural number greater than or equal to 2. The nodes 51-2 through 51-N may have the same structure as the node 51-1. For this reason, in the example illustrated in FIG. 2, the illustration of the structures of the nodes 51-2 through 51-N will be omitted.

In this example, the node 51-1 includes a Central Processing Unit (CPU) 52, a Dual Inline Memory Module (DIMM) 53 forming an example of a memory, and an Input/Output (I/O) unit 54. The CPU 52 includes a plurality of CPU cores 521-1 through 521-M having the same structure, where M is a natural number greater than or equal to 2, a Last Level (LL) cache memory 522 forming an example of a common secondary cache memory, a Memory Access Controller (MAC) 523, and an interconnect unit 524. In this example, the node 51-1 is connected to each of the nodes 51-2 through 51-N via the interconnect unit 524. More particularly, the interconnect unit 524 of the node 51-1 is connected to an interconnect unit of each of the nodes 51-2 through 51-N.

By providing the MAC 523 that controls the exchange of data between the CPU 52 and the DIMM 53, the CPU 52 and the DIMM 53 can exchange data directly with each other. The exchange of data between the CPU 52 and the other nodes 51-2 through 51-N is controlled by the interconnect unit 524. In this example, only 1 CPU 52 is mounted on a CPU/memory board forming each of the nodes 51-1 through 51-N of the processing system 50.

Figure 3:
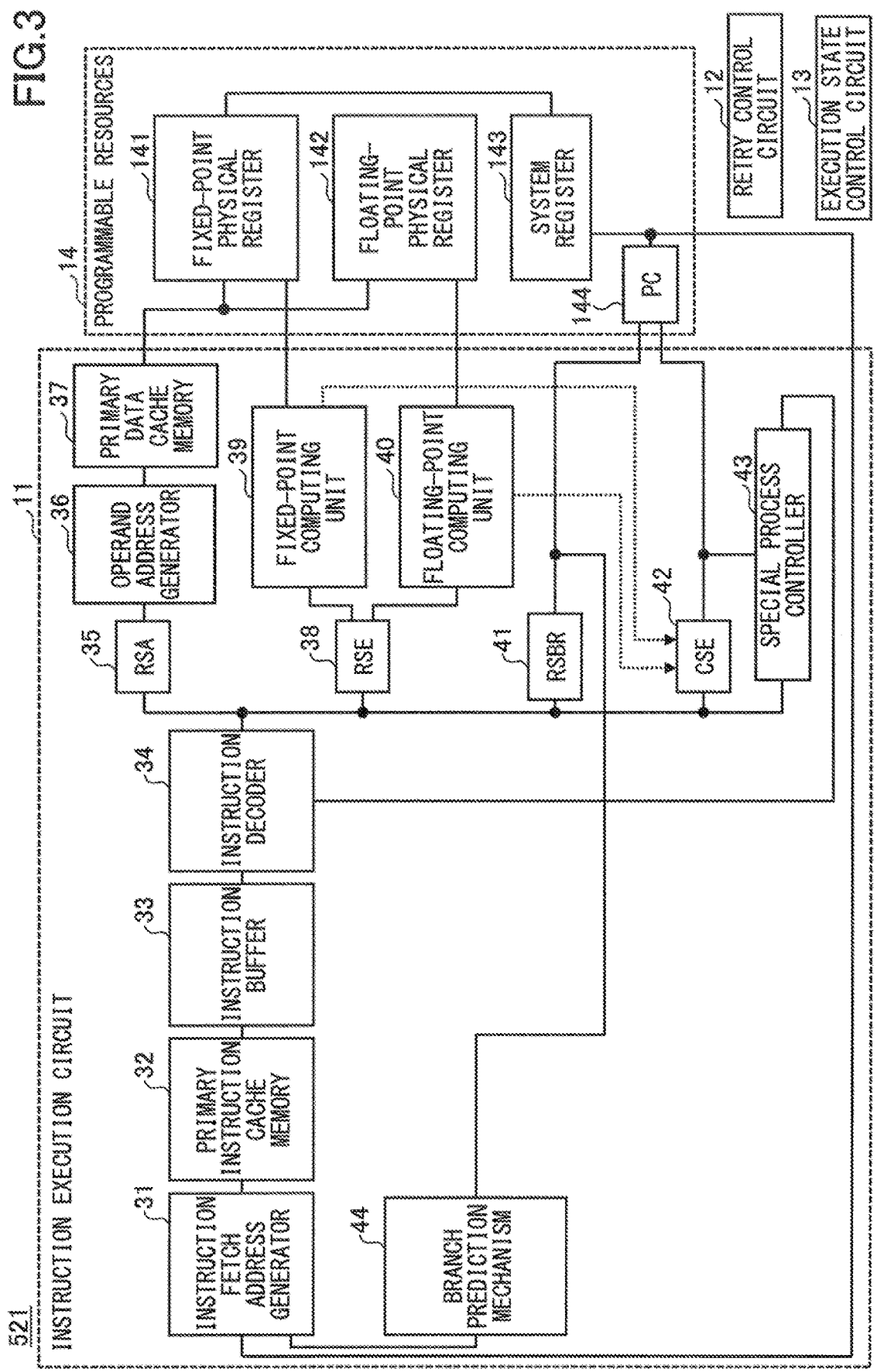
FIG. 3 is a block diagram illustrating an example of a CPU core according to one embodiment.

FIG. 3 is a block diagram illustrating an example of a CPU core according to one embodiment. A CPU core 521 illustrated in FIG. 3 is an example of the processing device 1, and may be used as each of the CPU cores 521-1 through 521-M illustrated in FIG. 2.

The instruction execution circuit 11 includes an instruction fetch address generator 31, a primary instruction cache memory 32, an instruction buffer 33, an instruction decoder 34, an operand address generator 36, a primary data cache memory 37, a fixed-point computing unit 39, and a floating-point computing unit 40. The instruction execution circuit 11 includes a Reservation Station for Address generator (RSA) 35, a Reservation Station for Execute (RSE) 38 for fixed-point operation and floating-point operation, and a Reservation Station for BRanch (RSBR) 41. The instruction execution circuit 11 further includes a Commit Stack Entry (CSE) 42, a special process controller 43, or the like.

The programmable resources 14 include a fixed-point physical register 141, a floating-point physical register 142, a system register 143, and a Program Counter (PC) 144. In this example, the fixed-point physical register 141 includes a Stack Pointer (SP) which will be described later.

The system register 143 includes the PSTATE register, which is the collection of the flags representing the execution states of the processing device 1. The spsel register, which will be described later, corresponds to a part of the flags representing the execution states, and is included in the PSTATE register. In addition, the system register 143 includes a Saved Process State Register (hereinafter also referred to as a "SPSR register") which is an example of a first specified storage region, and an Exception Link Register (hereinafter also referred to as an "ELR register") which is an example of a second specified storage region. Further, the system register 143 includes a Vector Base Address Register (hereinafter also referred to as a "VBAR register"), a SP_EL0 register for the SP and corresponding to an exception level EL0, and a SP_EL1 register for the SP and corresponding to an exception level EL1, or the like. The SPSR register includes a SPSR_EL1 register corresponding to the exception level EL1, or the like. The SPSR register holds the execution state within the PSTATE register at the time when the exception is generated. The SPSR_EL1 register includes a region for holding a value of the spsel register at the time when the exception is generated. The ELR register includes an ELR_EL1 register corresponding to the exception level EL1, or the like. The configuration of the system register 143 is not limited to the configuration described above for the case where the ARMv8-A architecture is employed.

Connections of the retry control circuit 12 and the execution state control circuit 13 of the CPU core 521, to the instruction execution circuit 11 of the CPU core 521, are evident from FIG. 1 or the like. For this reason, the illustration of the connections of the retry control circuit 12 and the execution state control circuit 13, to the instruction execution circuit 11 in FIG. 3, will be omitted for the sake of convenience.

The instruction fetch address generator 31 selects an instruction address input from the PC 144 or the branch prediction mechanism 44, in order to generate the address (or instruction fetch address) where the instruction is fetched. The instruction fetch address generator 31 outputs an instruction fetch request of the selected instruction address to the primary instruction cache memory 32. The primary instruction cache memory 32 outputs an instruction according to the instruction fetch request of the instruction address, to the instruction buffer 33. In a case where the instruction is not stored in the primary instruction cache memory 32, the instruction stored in a secondary cache memory (not illustrated) or a main storage (not illustrated) is output to the instruction buffer 33. The instruction buffer 33 supplies the buffered instructions to the instruction decoder 34 according to the description sequence within the program, such as in units of a predetermined number of instructions, for example.

The instruction decoder 34 simultaneously decodes the predetermined number of instructions according to the description sequence within the program. The instruction decoder 34 outputs the decoded results to the RSA 35, the RSE 38, and the RSBR 41 that control execution of the instructions, according to the type of the decoded instructions, to create required entries. By executing the instructions, starting from the instructions whose source operands required for the execution have become available in the RSA 35, the RSE 38, and the RSBR 41, it is possible to execute the instructions out of order (or "out-of-order"). In a case where the decoded instructions create the entries in the RSA 35, the RSE 38, and the RSBR 41, it becomes possible to execute the instructions out of order, by performing renaming corresponding to the fixed-point physical register 141 and the floating-point physical register 142. The complete reports of the instructions executed out of order in each of the RSA 35, the RSE 38, and the RSBR 41 are output to the CSE 42.

In addition, the instruction decoder 34 creates the entries in the CSE 42 including an instruction complete controller that controls an instruction complete process, with respect to all of the decoded instructions. More particularly, the CSE 42 includes a queue that stores the decoded instructions in the executing order, and a circuit that performs the instruction complete process based on information of the queue and the complete report of the instruction execution. Accordingly, the decoded instructions are stored in the queue of the CSE 42, and the complete reports of the instructions are waited. In other words, in the CSE 42, the circuit that performs the instruction complete process completes execution of the instruction corresponding to the complete report, among the instructions stored in the queue and waiting for the complete report, in the description sequence within the program, to update the programmable resources 14. When the execution of the instructions is completed by the instruction complete process, the CSE 42 outputs a procedure complete to the special process controller 43.

The operand address generator 36 generates the operand address according to the entry of the RSA 35, and outputs the generated operand address to the primary data cache memory 37. The primary data cache memory 37 outputs data of the generated operand address to the fixed-point physical register 142 and the floating-point physical register 142. The fixed-point computing unit 39 performs a fixed-point operation according to the entry of the RSE 38, and stores an execution result of the fixed-point operation in the fixed-point physical register 141. The floating-point computing unit 40 performs a floating-point operation according to the entry of the RSE 38, and stores an execution result of the floating-point operation in the floating-point physical register 142.

The instructions that are executed out of order in the RSA 35, the RSE 38, and the RSBR 41 perform the instruction complete process according to the description sequence within the program, under the control of the CSE 42. The CSE 42 updates the programmable resources 14, such as the fixed-point physical register 141, the floating-point physical register 142, the system register 143, the PC 144, or the like, only with respect to the instruction for which the execution is completed. The PC 144 outputs the address of the instruction that is currently being executed. The branch prediction mechanism 44 predicts whether the branch is performed by the branch instruction, according to the complete report of the branch instruction of the RSBR 41. In a case where the branch prediction mechanism 44 predicts that the branch is performed by the branch instruction, the branch prediction mechanism 44 outputs a branch destination address to be executed next, to the instruction fetch address generator 31.

The fixed-point physical register 141 and the floating-point physical register 142 that store the execution results of the operations can form an architecture register and a renaming register, for example. In the case where the instruction from the instruction decoder 34 creates the entry of the RSA 35 or the RSE 38, a renaming process is performed to assign the renaming register to a fixed-point renaming register and a floating-point renaming register.

The execution results of the operations are stored in the fixed-point renaming register and the floating-point renaming register that are assigned at the time of decoding the instructions. In addition, in a case where the physical register system is employed in which the renaming register and the architecture register coexist, the address of the physical register that is treated as the renaming register storing the execution result of the operation may be changed to that of the architecture register.

The instruction complete controller within the CSE 42 performs the instruction complete process in an order starting from an oldest entry of the CSE 42, and thus, the execution of instructions can be completed in the description sequence within the program. The instruction complete controller within the CSE 42 selects, from the CSE 42, a maximum number of instructions the execution of which can be simultaneously completed in 1 cycle. The completion of the execution of the instruction is controlled by regarding the selected entry as a target entry storing the instruction the execution of which is to be completed. The instruction decoder 34 outputs an entry number (or Instruction Identification (IID)) to be registered in the CSE 42 at the time of decoding the instructions. By storing the complete report of the instruction execution in the entry number of the CSE 42 indicated by the IID when the execution of the instruction is completed, it becomes possible to specify the instruction the execution of which is completed. In addition, in a case where an exception detection is notified from the fixed-point computing unit 39 or the floating-point computing unit 40 by a known method, as indicated by a phantom signal line in FIG. 3, the exception detection is recorded in the CSE 42, and the exception process start is notified to the special process controller 43 upon completion of instruction execution.

The special process controller 43 is used in a case where the exception detection is notified from the CSE 42, or an instruction (eret instruction, spsel update instruction, or the like) that involves a special process, such as updating a plurality of registers of the programmable resources 14, is decoded in the instruction decoder 34.

Figure 4:
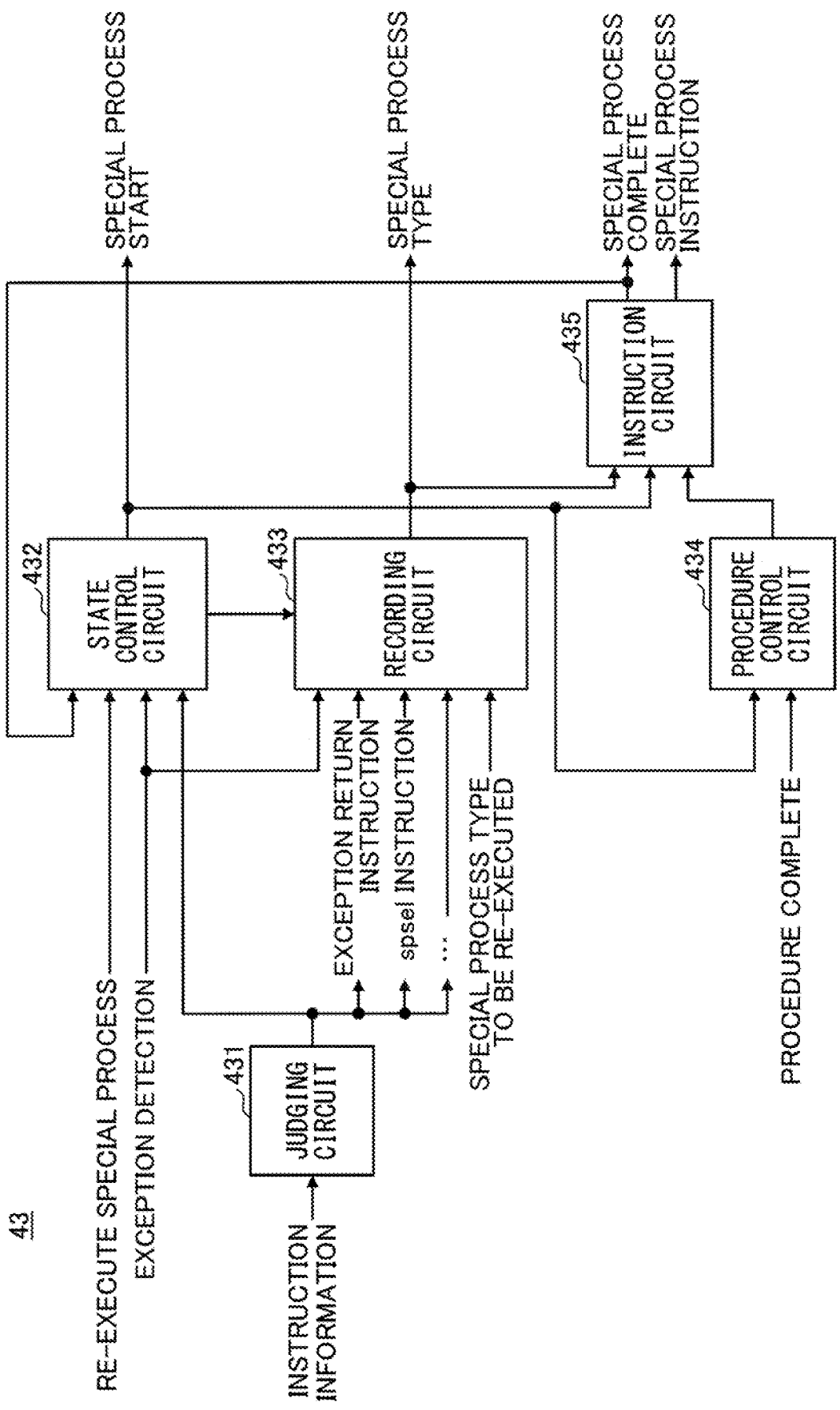
FIG. 4 is a block diagram illustrating an example of a special process controller.

FIG. 4 is a block diagram illustrating an example of the special process controller. The special process controller 43 illustrated in FIG. 4 includes a judging circuit 431, a state control circuit 432, a recording circuit 433 forming an example of a second recording circuit, a procedure control circuit 434, and an instruction circuit 435.

The judging circuit 431 receives, from the instruction decoder 34, instruction information indicating the type of instruction that is decoded. The judging circuit 431 judges whether the instruction requires a special process, based on the type of instruction indicated by the received instruction information. In a case where the judging circuit 431 judges that the type of instruction (exception return instruction spsel update instruction, or the like) requires the special process, the judging circuit 431 notifies the state control circuit 432 that the special process is required, and notifies the special process type to the recording circuit 433.

The state control circuit 432 controls the state for performing various processes from the special process start until the special process complete. The state control circuit 432 causes a transition to a special process state, in a case where the exception detection is notified from the CSE 42, or the judging circuit 431 judges that the type of instruction requires the special process, or an instruction to re-execute the special process is received from the retry control circuit 12. When the transition to the special process state is made, the state control circuit 432 notifies the special process start to the procedure control circuit 434, the instruction circuit 435, and the retry control circuit 12. When the special process complete is notified from the instruction circuit 435, the state control circuit 432 notifies the special process start to the procedure control circuit 434, the instruction circuit 435, and the retry control circuit 12. When the special process complete is notified from the instruction circuit 435, the state control circuit 432 causes a transition from the special process state to return to the instruction process state other than the special process state.

The recording circuit 433 receives the exception detection notified from the CSE 42, the type of instruction requiring the special process and notified from the judging circuit 431, and the special process type to be re-executed notified from the retry control circuit 12, and records the special process type during a time from the special process start to the special process complete. In addition, the recording circuit 433 notifies the recorded special process type to the instruction circuit 435 and the retry control circuit 12.

The procedure control circuit 434 sets an initial value to a special process procedure number spn, when the special process start is notified from the state control circuit 432, and adds 1 to the special process procedure number spn (that is, increments spn to spn=spn+1) when a procedure complete is notified from the instruction complete controller within the CSE 42. The procedure control circuit 434 notifies the special process procedure number spn, after being added 1 (that is, after being incremented by 1), to the instruction circuit 435.

When the special process start is notified from the state control circuit 432, the instruction circuit 435 notifies a special process instruction to a circuit that is used to execute the special process. The circuit that is used to execute the special process includes a circuit provided at a stage subsequent to the instruction decoder 34, for example, in the example illustrated in FIG. 3. The special process instruction is notified based on the special process type notified from the recording circuit 433, and the special process procedure number spn notified from the procedure control circuit 434. When the instruction circuit 435 finishes outputting the special process instruction up to the last special process procedure number spn that is determined in advance for every special process type, the instruction circuit 435 notifies the special process complete to the state control circuit 432 and the retry control circuit 12.

Figure 5:
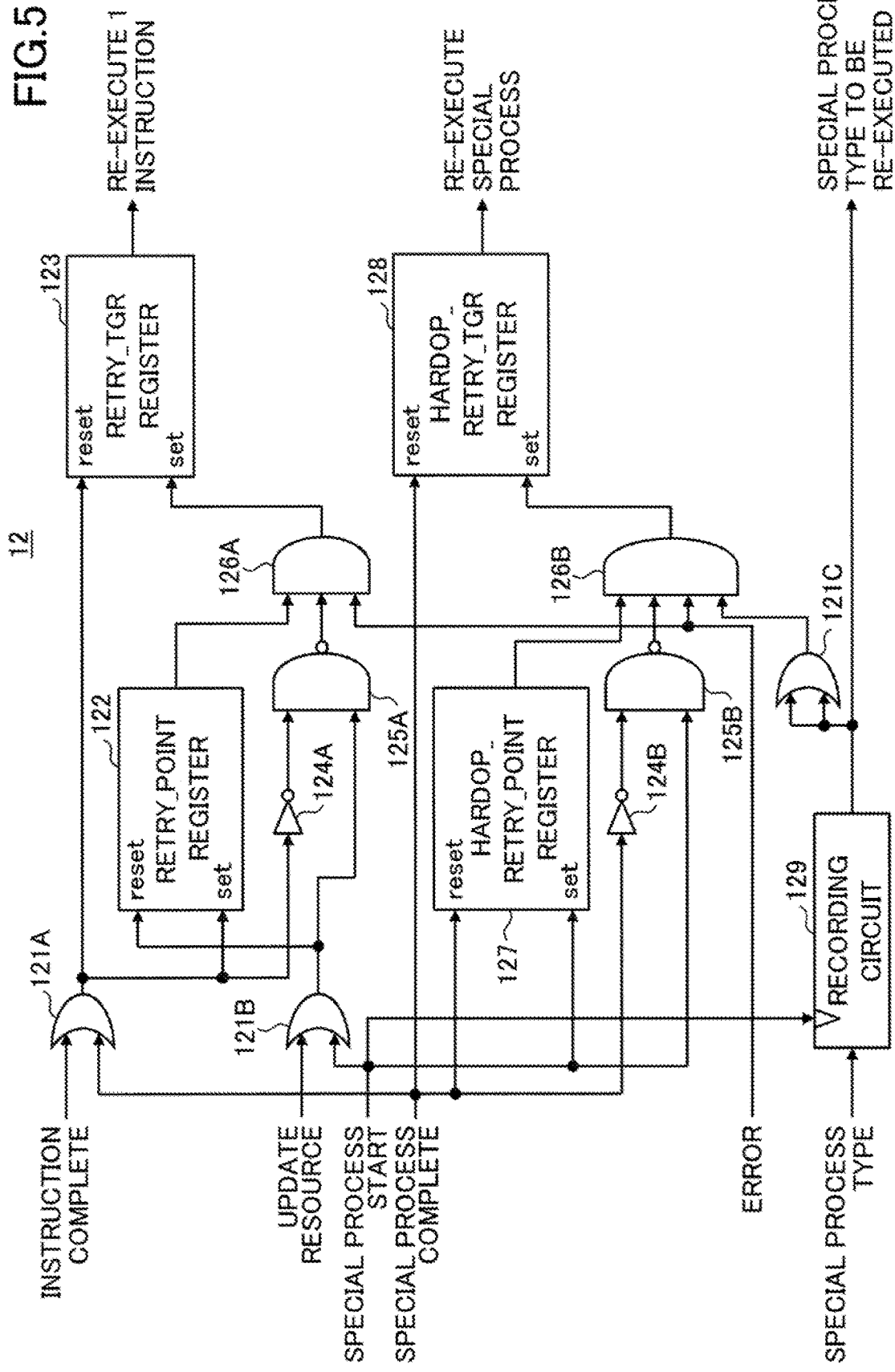
FIG. 5 is a diagram illustrating an example of a retry control circuit.

FIG. 5 is a diagram illustrating an example of the retry control circuit. The retry control circuit 12 illustrated in FIG. 5 includes a RETRY_POINT register 122, a RETRY_TGR register 123, a HARDOP_RETRY_POINT register 127, a HARDOP_RETRY_TGR register 128, a recording circuit 129 forming an example of the first recording circuit, and gate circuits. The registers 122, 123, 127, and 128 form an example of first, second, third, and fourth registers, respectively, and may be formed by a Reset-Set (RS) flip-flop circuit, for example. The gate circuits include OR circuits 121A, 121B, and 121C, inverter circuits 124A and 124B, NAND circuits 125A and 125B, and AND circuits 126A and 126B, and perform logic operations.

The instruction complete from the instruction execution circuit 11 is input to one input terminal of the OR circuit 121A. The resource update from the instruction execution circuit 11 is input to one input terminal of the OR circuit 121B. The special process start from the instruction execution circuit 11 is input to the other input terminal of the OR circuit 121B, one input terminal of the AND circuit 125B, a set terminal of the HARDOP_RETRY_POINT register 127, and the recording circuit 129. The special process complete from the instruction execution circuit 11 is input to the other input terminal of the OR circuit 121A, the inverter circuit 124B, and a reset terminal of each of the HARDOP_RETRY_POINT register 127 and the HARDOP_RETRY_TGR register 128. The error notification from the instruction execution circuit 11 is input to the AND circuits 126A and 126B. The special process type from the instruction execution circuit 11 is input to the recording circuit 129.

An output of the OR circuit 121A is input to a set terminal of the RETRY_POINT register 122, and a reset terminal of the RETRY_TGR register 123. An output of the OR circuit 121B is input to a reset terminal of the RETRY_POINT register 122, and the NAND circuit 125A. An output of the inverter circuit 124A is input to the NAND circuit 125A. Outputs of the NAND circuit 125A and the RETRY_POINT register 122 are also input to the AND circuit 126A. An output of the AND circuit 126A is input to a set terminal of the RETRY_TGR register 123. An output of the inverter circuit 124B is also input to the NAND circuit 125B. Outputs of the HARDOP_RETRY_POINT register 127 and the NAND circuit 125B are also input to the AND circuit 126B. Further, an output of the recording circuit 129 is input to the AND circuit 126B via the OR circuit 121C. An output of the AND circuit 126B is input to a set terminal of the HARDOP_RETRY_TGR register 128.

The RETRY_POINT register 122 stores a flag that is used to judge whether the timing is the timing at which the retry process can be performed. The RETRY_POINT register 122 is reset when the resource update is performed at a timing other than a timing of the instruction complete, and is set at the timing of the instruction complete. The RETRY_TGR register 123 stores a flag that is used to indicate that performing the retry process is definite and the retry process is not completed. The RETRY_TGR register 123 is set in a case where the RETRY_POINT register 122 is set at the error detection timing and the condition for resetting the RETRY_POINT register 122 is not satisfied. In addition, the RETRY_TGR register 123 is reset upon completion of instruction execution, but is reset at the timing of the special process start so that the retry process is not started immediately in response to the error during the special process. Accordingly, the RETRY_TGR register 123 instructs re-execution of 1 instruction to the instruction execution circuit 11.

The HARDOP_RETRY_POINT register 127 stores a flag that is used to judge whether the timing is the timing at which the special process can be re-executed. The HARDOP_RETRY_POINT register 127 is set at a timing of the special process start, and is reset at a timing of the special process complete. The HARDOP_RETRY_TGR register 128 stores a flag that is used to indicate that performing the retry process of the special process is definite and the retry process of the special process is not completed. The HARDOP_RETRY_TGR register 128 is set in a case where the HARDOP_RETRY_POINT register 127 is set at the error detection timing and the condition for resetting the HARDOP_RETRY_POINT register 127 is not satisfied. In addition, the HARDOP_RETRY_TGR register 128 is reset at the timing of the special process complete. Accordingly, the HARDOP_RETRY_TGR register 128 instructs re-execution of the special process to the instruction execution circuit 11.

The recording circuit 129 records the special process type that is notified at the timing of the special process start. The recording circuit 129 sets the HARDOP_RETRY_TGR register 128 via the OR circuit 121C and the AND circuit 125B, only in the case where the special process recorded at the error detection timing is re-executable. In addition, when re-executing the special process, the recording circuit 129 notifies the special process type re-executed to the instruction execution circuit 11.

Accordingly, in the case where the error is detected during the special process, a judgment is made to determine, from the special process type, whether the special process is re-executable, and in the case where the special process judged to be re-executable, the retry process is instructed to re-execute the special process from the start.

The recording circuit 433 within the special process controller 43 of the instruction execution circuit 11 illustrated in FIG. 3 forms the example of the second recording circuit that records the special process being executed. In addition, the recording circuit 129 of the retry control circuit 12 illustrated in FIG. 5 forms the example of the first recording circuit that records the special process type at the timing of the special process start, that is, at the special process starting point. The registers 127 and 128 or the like of the retry control circuit 12 form the example of the circuit that judges, from the recorded special process type, whether the special process is re-executable in the case where the error notification from the instruction execution circuit 11 is received upon detection of the error during the special process. In the case where this circuit of the retry control circuit 12 judges that the special process is re-executable, this circuit of the retry control circuit 12 instructs the instruction execution circuit 11 to perform the retry process to re-execute the special process from the start, that is, re-execute the special process. The special process controller 43 of the instruction execution circuit 11 forms the example of the circuit that performs the retry process to re-execute the special process, based on the instruction from the retry control circuit 12 to perform the retry process to re-execute the special process from the start, that is, re-execute the special process.

Figure 6:
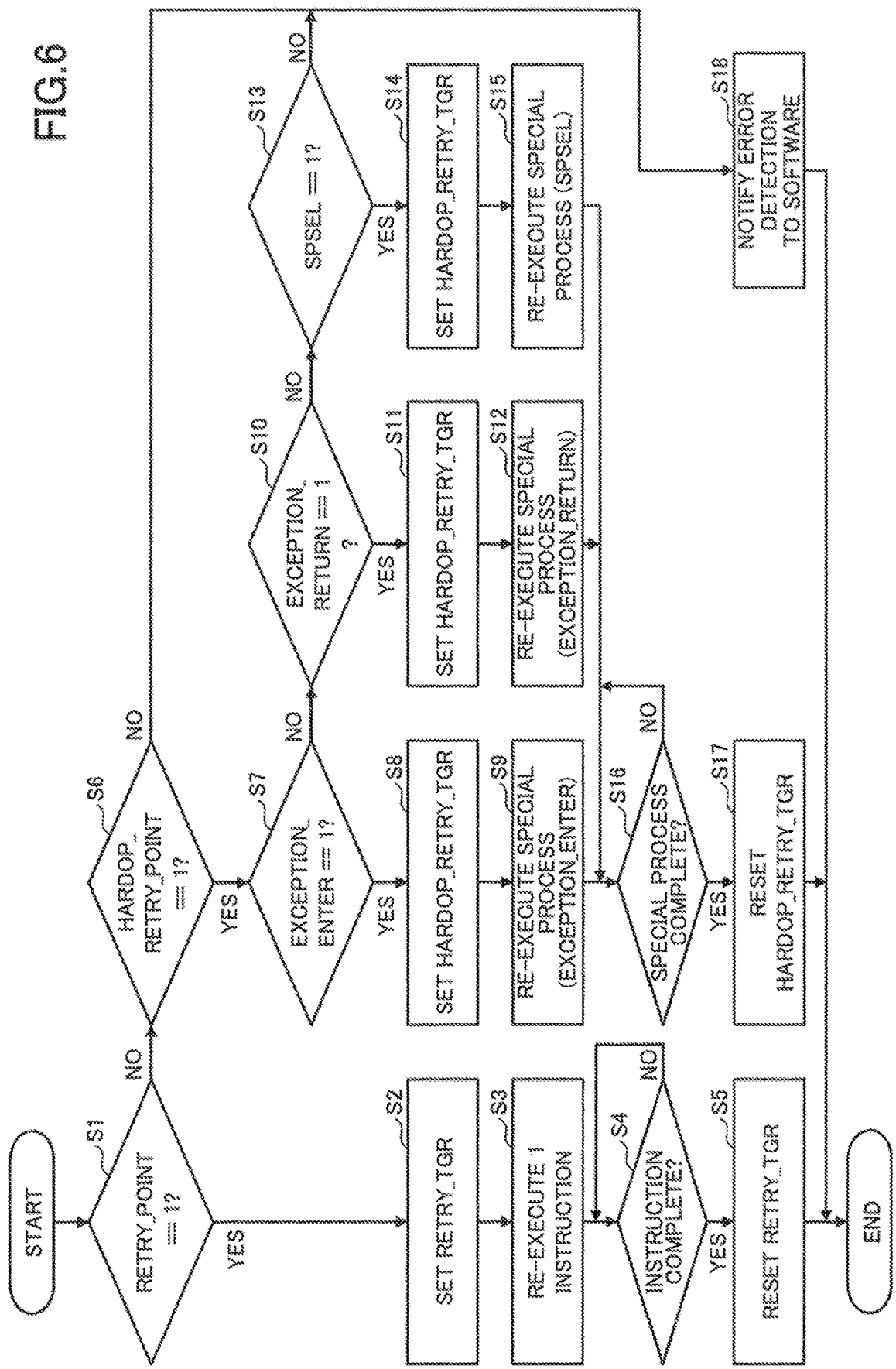
FIG. 6 is a flow chart for explaining an example of a retry process according to one embodiment.

FIG. 6 is a flow chart for explaining an example of the retry process according to one embodiment. The retry process illustrated in FIG. 6 starts when the instruction execution circuit 11 detects the error during the retry process, and the AND circuits 126A and 126B of the retry control circuit 12 receives the error notification.

In step S1, the retry control circuit 12 judges whether the value of the flag stored in the RETRY_POINT register 122 is 1 (RETRY_POINT=1), and the process advances to step S2 when the judgment result in step S1 is YES. In step S2, the retry control circuit 12 sets the RETRY_TGR register 123 by the output of the AND circuit 126A. In step S3, the retry control circuit 12 instructs re-execution of 1 instruction to the instruction execution circuit 11 from the RETRY_TGR register 123. In step S4, the retry control circuit 12 judges whether the instruction complete from the instruction execution circuit 11 is received via the OR circuit 121A. When the judgment result in step S4 is YES, the process advances to step S5. In step S5, the retry control circuit 12 resets the RETRY_TGR register 123 by the output of the OR circuit 121A, and the process ends.

On the other hand, when the judgment result in step S1 is NO, the process advances to step S6. In step S6, the retry control circuit 12 judges whether the value of the flag stored in the HARDOP_RETRY_POINT register 127 is 1, and the process advances to step S7 when the judgment result in step S6 is YES. In step S7, the retry control circuit 12 judges whether the special process type recorded in the recording circuit 129 is the exception process (EXCEPTION_ENTER), and the process advances to step S8 when the judgment result in step S7 is YES. In step S8, the retry control circuit 12 sets the HARDOP_RETRY_TGR register 128 by the output of the AND circuit 126B. In step S9, the retry control circuit 12 instructs re-execution of the special process indicating the exception process, from the HARDOP_RETRY_TGR register 128 to the instruction execution circuit 11. After step S9, the process advances to step S16 which will be described later.

On the other hand, when the judgment result in step S7 is NO, the process advances to step S10. In step S10, the retry control circuit 12 judges whether the special process type recorded in the recording circuit 129 is the exception return process (EXCEPTION_RETURN), and the process advances to step S11 when the judgment result in step S10 is YES. In step S11, the retry control circuit 12 sets the HARDOP_RETRY_TGR register 128 by the output of the AND circuit 126B. In step S12, the retry control circuit 12 instructs re-execution of the special process indicating the exception return process, from the HARDOP_RETRY_TGR register 128 to the instruction execution circuit 11. After step S12, the process advances to step S16 which will be described later.

When the judgment result in step S10 is NO, the process advances to step S13. In step S13, the retry control circuit 12 judges whether the special process type recorded in the recording circuit 129 is the spsel update process (SPSEL), and the process advances to step S14 when the judgment result in step S13 is YES. In step S14, the retry control circuit 12 sets the HARDOP_RETRY_TGR register 128 by the output of the AND circuit 126B. In step S15, the retry control circuit 12 instructs re-execution of the special process indicating the spsel update, from the HARDOP_RETRY_TGR register 128 to the instruction execution circuit 11. After step S15, the process advances to step S16 which will be described later.

In step S16, the retry control circuit 12 judges whether the special process complete is received from the instruction execution circuit 11, with respect to the special process re-executed output at one of steps S9, S12, and S14. When the judgment result in step S16 is YES, the process advances to step S17. In step S17, the retry control circuit 12 resets the HARDOP_RETRY_TGR register 128 by the special process complete, and the process ends.

When the judgment result in step S6 is NO, or the judgment result in step S13 is NO, the process advances to step S18. In step S18, the retry control circuit 12 notifies the error detection to software, and the process ends.

Accordingly, when the error is detected during the special process, the value of the flag in the RETRY_POINT register 122 is checked first. In the case where the flag in the RETRY_POINT register 122 is 1, the value of the flag in the RETRY_TGR register 123 is set to 1, before re-executing 1 instruction, and the instruction complete is waited. The value of the flag in the RETRY_TGR register 123 is reset to 0 after the instruction complete, and the retry process ends.

In the case where the value of the flag in the RETRY_POINT register 122 is 0, the value of the flag in the HARDOP_RETRY_POINT register 127 is checked. If the value of the flag in the HARDOP_RETRY_POINT register 127 is 1, the special process type recorded in the recording circuit 129 is checked. If the special process type is one of EXCEPTION_ENTER, EXCEPTION_RETURN, and SPSEL that is re-executable, the value of the flag in the HARDOP_RETRY_TGR register 128 is set to 1, and the recorded special process is re-executed. After the special process complete, the value of the flag in the HARDOP_RETRY_TGR register 128 is reset to 0, and the retry process ends.

In the case where the values of the flags in the RETRY_POINT register 122 and the HARDOP_RETRY_POINT register 127 are both 0, it is judged that the retry process cannot be performed, the error detection is notified to the software, and the process ends. In addition, in the case where the value of the flag in the HARDOP_RETRY_POINT register 127 is 1 and the special process type recorded in the recording circuit 129 is none of EXCEPTION_ENTER, EXCEPTION_RETURN, and SPSEL, it is judged that the retry process cannot be performed, the error detection is notified to the software, and the process ends.

Next, procedures of the special process will be described for the cases where the special process is the exception process, the exception return process, and the update process that updates the selection value of the stack pointer.

In this embodiment, the exception process involving the exception detection in the case where the ARMv8-A architecture is used, for example, is performed by the following procedures ST1 through ST3.

In the procedure ST1, an execution state within the PSTATE register at the time when the exception is generated, is stored in the SPSR register. In the procedure ST1, a return destination of the exception, indicated by the PC 144, is simultaneously stored in the ELR register. In this embodiment, the special process starting point for the case where the special process is the exception process, is the point in time when this procedure ST1 is completed.

In the procedure ST2, the value of the SP is written in a SP_ELx register corresponding to the execution state before the change (EL and spsel within the SPSR register).

In the procedure ST3, the value of the SP_ELx register corresponding to the execution state after the change (current EL (currentEL) and spsel within the PSTATE register) is written in the SP, and the execution state within the PSTATE register is simultaneously changed to the value for the exception process. Further, in the procedure ST3, the PC 144 is simultaneously changed to the value for the exception process. The value for the exception process is a value obtained by adding an offset according to the exception type to the value of the VBAR register, for example.

In the exception process, the completion of the process of the procedure ST1 may be treated as the special process start, and the completion of the process of the procedure ST3 may be treated as the special process complete, to re-execute the process from the procedure ST2 in the case where the error is detected during the special process.

FIG. 7 is a diagram for explaining an example of an operation of the exception process. FIG. 7 illustrates the example of the operation of the exception process for a case where the exception is generated and the exception level is changed from EL0 to EL1. In FIG. 7, PSTATE denotes the PSTATE register value, SPSR_EL1 denotes the SPSR_EL1 register value, PC denotes the value of the PC 144 (hereinafter also referred to as a "PC value"), ELR_EL1 denotes the ELR_EL1 register value, and SP denotes the SP value. In addition, SP_EL0 denotes the SP_EL0 register value, SP_EL1 denotes the value of the SP_EL1 register, and HARDOP_ENTRY_POINT denotes the value of the HARDOP_RETRY_POINT register 127 (hereinafter also referred to as a "HARDOP_RETRY_POINT register value").

In this example, the {PSTATE, SPSR_EL1, PC, ELR_EL1, SP, SP_EL0, SP_EL1} register values at the time when the exception is generated are represented by {A, B, C, D, E, F, G}, respectively. More particularly, the PSTATE register value is represented by A, the SPSR_EL1 register value is represented by B, the PC value is represented by C, the ELR_EL1 register value is represented by D, the SP value is represented by E, the SP_EL0 register value is represented by F, and the SP_EL1 register value is represented by G.

Accordingly, in this example, in the procedure ST1, the PSTATE value A is stored in the SPSR_EL1 register, and the PC value C is simultaneously written to the ELR_EL1 register. In the procedure ST2, the SP value E is written to the SP_EL0 register. In the procedure ST3, the SP_EL1 value G is written to the SP, an execution state value X for the exception process is simultaneously written to the PSTATE register, and a value Y for the exception process is simultaneously written to the PC. The HARDOP_RETRY_POINT value is set to 1 upon completion of the process of the procedure ST1, and is set to 0 upon completion of the process of the procedure ST3. In the case where the error is detected in the state in which HARDOP_RETRY_POINT=1 due to the exception process, the processes of the procedure ST2 and the procedure ST3 are re-executed. Because the procedure ST2 and the procedure ST3 in this embodiment are processes that do not refer to the resources updated by the procedure ST1 and the procedure ST2, the same result is also obtained when re-executed upon detection of the error.

In this embodiment, the exception return process executed by the eret instruction in the case where the ARMv8-A architecture is used, for example, is performed by the following procedures ST11 through ST13.

In the procedure ST11, the value of the SPSR register is written to the PSTATE register, and the value of the ELR register is simultaneously written to the PC 144. In this embodiment, the special process starting point for the case where the special process is the exception return process, is the point in time when this procedure ST11 is completed.

In the procedure ST12, SP value is written to the SP_ELx register corresponding to the execution state before the change (EL and spsel within the SPSR register.

In the procedure ST13, the value of the SP_ELx register corresponding to the execution state after the change (currentEL and spsel within the PSTATE register) is written to the SP.

In the exception return process, the completion of the process of the procedure ST11 may be treated as the special process start, and the completion of the process of the procedure ST13 may be treated as the special process complete, to re-execute the process from the procedure ST12 in the case where the error is detected during the special process.

FIG. 8 is a diagram for explaining an example of an operation of the exception return process. FIG. 8 illustrates the example of the operation of the exception return process for a case where the eret instruction is executed and the exception level is changed from EL1 to EL0. In FIG. 8, PSTATE denotes the PSTATE register value, SPSR_EL1 denotes the SPSR_EL1 register value, PC denotes the PC value, ELR_EL1 denotes the ELR_EL1 register value, and SP denotes the SP value. In addition, SP_EL0 denotes the SP_EL0 register value, SP_EL1 denotes the value of the SP_EL1 register, and HARDOP_ENTRY_POINT denotes the value of the HARDOP_RETRY_POINT register 127 (that is, the HARDOP_RETRY_POINT register value).

In this example, the {PSTATE, SPSR_EL1, PC, ELR_EL1, SP, SP_EL0, SP_EL1} register values at the time when execution of the eret instruction is started are represented by {A, B, C, D, E, F, G}, respectively. More particularly, the PSTATE register value is represented by A, the SPSR_EL1 register value is represented by B, the PC value is represented by C, the ELR_EL1 register value is represented by D, the SP value is represented by E, the SP_EL0 register value is represented by F, and the SP_EL1 register value is represented by G.

Accordingly, in this example, in the procedure ST11, the SPSR_EL1 value B is written in the PSTATE register, and the ELR_EL1 value D is simultaneously written to the PC. In the procedure ST12, the SP value E is written to the SP_EL1 register corresponding to the execution state before the change. In the procedure ST13, the SP_EL0 value F corresponding to the execution state after the change is written to the SP.

The HARDOP_RETRY_POINT value is set to 1 upon completion of the process of the procedure ST11, and is set to 0 upon completion of the process of the procedure ST13. In the case where the error is detected in the state in which HARDOP_RETRY_POINT=1 due to the exception return process, the processes of the procedure ST12 and the procedure ST13 are re-executed. Because the procedure ST12 and the procedure ST13 in this embodiment are processes that do not refer to the resources updated by the procedure ST11 and the procedure ST12, the same result is also obtained when re-executed upon detection of the error.

In this embodiment, the update process executed by the spsel update instruction in the case where the ARMv8-A architecture is used, for example, is performed by the following procedures ST21 through ST23.

In the procedure ST21, a value specified by the instruction is written to the spsel register, and a subsequent instruction address is simultaneously written to the PC 144. In this embodiment, the special process starting point for the case where the special process is the spsel update process, is the point in time when this procedure ST21 is completed.

In the procedure ST22, SP value is written to the SP_ELx register corresponding to the spsel register before the change.

In the procedure ST23, the value of the SP_ELx register corresponding to the spsel register after the change is written to the SP.

In the spsel update process, the completion of the process of the procedure ST21 may be treated as the special process start, and the completion of the process of the procedure ST23 may be treated as the special process complete, to re-execute the process from the procedure ST22 in the case where the error is detected during the special process.

FIG. 9 is a diagram for explaining an example of an operation of the spsel update process. FIG. 9 illustrates the example of the operation of the spsel update process for a case where the spsel update instruction is executed in the state in which currentEL=1 and spsel=1. In FIG. 9, spsel denotes the spsel register value, PC denotes the PC value, SP denotes the SP value, SP_EL0 denotes the SP_EL0 register value, SP_EL1 denotes the SP_EL1 register value, and HARDOP_ENTRY_POINT denotes the value of the HARDOP_RETRY_POINT register 127 (that is, the HARDOP_RETRY_POINT register value).

In this example, the {PC, SP, SP_EL0, SP_EL1.} register values at the time when execution of the spsel update instruction is started are represented by {A, B, C, D}, respectively. More particularly, the PC value is represented by A, the SP value is represented by B, the SP_EL0 register value is represented by C, and the SP_EL1 register value is represented by D.

Accordingly, in this example, in the procedure ST21, a value 0 specified by the instruction is written to the spsel register, and the subsequent instruction address A+4 is simultaneously written to the PC. In the procedure ST22, the SP value B is written to the SP_EL1 register corresponding to the spsel register value before the change. In the procedure ST23, the SP_EL0 value C corresponding to the spsel register value after the change is written to the SP. The HARDOP_RETRY_POINT value is set to 1 upon completion of the process of the procedure ST21, and is set to 0 upon completion of the process of the procedure ST23. In the case where the error is detected in the state in which HARDOP_RETRY_POINT=1 due to the spsel update process, the processes of the procedure ST22 and the procedure ST23 are re-executed. Because the procedure ST22 and the procedure ST23 in this embodiment are processes that do not refer to the resources updated by the procedure ST21 and the procedure ST22, the same result is also obtained when re-executed upon detection of the error.

According to each of the embodiments described above, in the processing device that executes the special process, such as the exception process, the exception return process, the spsel update process, or the like in a plurality of cycles, it is possible to perform the retry process according to the type of the special process in the case where the error is detected during the special process. In addition, in the case where the error is detected during the special process and the type of the special process is re-executable, the execution of the instruction can be continued by performing the retry process, without causing an abnormal end of the program. As a result, it is possible to improve the reliability of the processing device.

According to one aspect of the embodiments, it is possible to provide a processing device, and a method of controlling the processing device, which can perform a retry process according to the type of special process in a case where an error is detected during the special process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing device that performs a first process in a plurality of cycles to update a plurality of resources included in programmable resources, the processing device comprising:
    an instruction execution circuit configured to record that the first process is being executed, and to make an error notification when an error is detected during execution of an instruction; and
    a retry control circuit configured to record a type of the first process at a starting point of the first process, judge from the recorded type whether the first process is re-executable upon receiving the error notification during the first process, and instruct re-execution of the first process from a start of the first process in a case where the first process is judged to be re-executable,
    the instruction execution circuit is configured to perform a retry process to re-execute the first process when instructed from the retry control circuit to re-execute the first process, and the instruction execution circuit performs a process including
        notifying a first process start and the type of the first process to the retry control circuit at the starting point of the first process,
        notifying a first process complete to the retry control circuit using the instruction complete as instructions of processes other than the first process, and
        updating the resources of the programmable resources according to re-execution of the first process.

2. The processing device as claimed in claim 1, wherein the retry control circuit includes
    a first register configured to store a flag used for judging whether the retry process can be performed, the first register being reset when resources are updated at a timing other than instruction complete, and set at a timing of the instruction complete,
    a second register configured to store a flag for indicating that performing the retry process is definite and the retry process is not completed, the second register being set when the first register is set at an error detection timing and a condition for resetting the first register is not satisfied, and reset at the timing of the instruction complete and a timing of the first process start, to instruct re-execution of 1 instruction to the instruction execution circuit,
    a third register configured to store a flag used for judging whether the first process is re-executable, the third register being set at the timing of the first process start, and reset at the timing of completion of the first process,
    a fourth register configured to store a flag indicating that performing the retry process of the first process is definite and the retry process of the first process is not completed, the fourth register being set when the third register is not set at the error detection timing, and a condition for resetting the third register is satisfied, and reset at the timing of completion of the first process, to instruct re-execution of the first process to the instruction execution circuit, and
    a first recording circuit configured to record the type of the first process notified at the starting point of the first process,
    wherein the first recording circuit sets the fourth register only in a case where the first process recorded at the error detection timing is re-executable, and notifies the type of the first process to be re-executed when re-executing the first process.

3. The processing device as claimed in claim 1, wherein the instruction execution circuit includes
   an instruction decoder configured to decode instructions,
   a state control circuit configured to control states for performing a process from the first process start to the first process complete,
   a judging circuit configured to judge whether the instruction requires the first process, based on a type of decoded instruction indicated by instruction information received from the instruction decoder, and notifying the state control circuit that the first process is required in a case where the type of the decoded instruction is judged as requiring the first process,
   a second recording circuit configured to receive an exception detection notification, the type of instruction requiring the first process from the judging circuit, and the type of the first process to be re-executed from the retry control circuit, and record the type of the first process during a time from the first process start to the first process complete,
   a procedure control circuit configured to set an initial value of a first process procedure number upon receiving notification of the first process start from the state control circuit, and increment the first process procedure number upon receiving notification of a procedure complete, and
   an instruction circuit configured to notify, to a circuit that is used to execute the first process, a first process instruction, based on the type of the first process notified from the second recording circuit, and the first process procedure number notified from the procedure control circuit, upon receiving notification of the first process start from the state control circuit, and notify the first process complete to the state control circuit and the retry control circuit after outputting the first process instruction to a last first process procedure number determined in advance for every type of the first process,
   wherein the state control circuit causes a transition to a first process state upon receiving the exception detection notification, or upon judging by the judging circuit that the type of instruction requires the first process, or upon receiving the instruction to re-execute the first process from the retry control circuit,
   wherein the state control circuit after making the transition to the first process state notifies the first process start to the procedure control circuit, the instruction circuit, and the retry control circuit, and makes a transition from the first process state to return to a process state other than the first process state upon receiving notification of the first process complete from the instruction circuit,
   wherein the judging circuit notifies the type of the first process to the second recording circuit,
   wherein the second recording circuit notifies the recorded type to the instruction circuit and the retry control circuit, and
   wherein the procedure control circuit notifies the first process procedure number after incrementing to the instruction circuit.

4. The processing device as claimed in claim 1, wherein the first process executed by the instruction execution circuit is an exception process, and
   the starting point of the first process is a point in time when a procedure to store an execution state at a time when an exception is generated in a first specified storage region included in the programmable resources, and simultaneously store a return destination of the exception indicated by a program counter included in the programmable resources in a second specified storage region included in the programmable resources, is completed.

5. The processing device as claimed in claim 1, wherein the first process executed by the instruction execution circuit is an exception return process, and
   the starting point of the first process is a point in time when a procedure to write a value of a first specified storage region included in the programmable resources to an execution state, and simultaneously write a value of a second specified storage region included in the programmable resources to a program counter included in the programmable resources, is completed.

6. The processing device as claimed in claim 1, wherein the first process executed by the instruction execution circuit is an update process that updates a selection value of a stack pointer included in the programmable resources, and
   the starting point of the first process is a point in time when a procedure to write a value specified by the instruction to a register included in the programmable resources, and simultaneously write a subsequent instruction address to a program counter included in the programmable resources, is completed.

7. A method of controlling a processing device that performs a first process in a plurality of cycles to update a plurality of resources included in programmable resources, the method comprising:
   recording, by an instruction execution circuit, that the first process is being executed;
   making an error notification, by the instruction execution circuit, when an error is detected during execution of an instruction;
   recording, by a retry control circuit, a type of the first process at a starting point of the first process, judging from the recorded type whether the first process is re-executable upon receiving the error notification during the first process, and instructing re-execution of the first process from a start of the first process in a case where the first process is judged to be re-executable; and
   performing a retry process, by the instruction execution circuit, to re-execute the first process when instructed from the retry control circuit to re-execute the first process,
   a process performed by the instruction execution circuit includes
      notifying a first process start and the type of the first process to the retry control circuit at the starting point of the first process,
      notifying a first process complete to the retry control circuit using the instruction complete as instructions of processes other than the first process, and
      updating the resources of the programmable resources according to re-execution of the first process.

8. The method of controlling the processing device as claimed in claim 7, wherein a process performed by the retry control circuit includes
   storing, by a first register, a flag used for judging whether the retry process can be performed, the first register being reset when resources are updated at a timing other than instruction complete, and set at a timing of the instruction complete,
   storing, by a second register, a flag for indicating that performing the retry process is definite and the retry process is not completed, the second register being set when the first register is set at an error detection timing and a condition for resetting the first register is not satisfied, and reset at the timing of the instruction complete and a timing of the first process start, to instruct re-execution of 1 instruction to the instruction execution circuit, storing, by a third register, a flag used for judging whether the first process is re-executable, the third register being set at the timing of the first process start, and reset at the timing of completion of the first process, storing, by a fourth register, a flag indicating that performing the retry process of the first process is definite and the retry process of the first process is not completed, the fourth register being set when the third register is not set at the error detection timing, and a condition for resetting the third register is satisfied, and reset at the timing of completion of the first process, to instruct re-execution of the first process to the instruction execution circuit, recording, by a first recording circuit, the type of the first process notified at the starting point of the first process, and setting, by the first recording circuit, the fourth register only in a case where the first process recorded at the error detection timing is re-executable, to notify the type of the first process to be re-executed when re-executing the first process.

9. The method of controlling the processing device as claimed in claim 7, wherein the process performed by the instruction execution circuit further includes causing an instruction decoder to decode instructions, causing a state control circuit to control states for performing a process from the first process start to the first process complete, causing a judging circuit to judge whether the instruction requires the first process, based on a type of decoded instruction indicated by instruction information received from the instruction decoder, and notify the state control circuit that the first process is required in a case where the type of the decoded instruction is judged as requiring the first process, causing a second recording circuit to receive an exception detection notification, the type of instruction requiring the first process from the judging circuit, and the type of the first process to be re-executed from the retry control circuit, and record the type of the first process during a time from the first process start to the first process complete, causing a procedure control circuit to set an initial value of a first process procedure number upon receiving notification of the first process start from the state control circuit, and increment the first process procedure number upon receiving notification of a procedure complete, causing an instruction circuit to notify, to a circuit that is used to execute the first process, a first process instruction, based on the type of the first process notified from the second recording circuit, and the first process procedure number notified from the procedure control circuit, upon receiving notification of the first process start from the state control circuit, and notify the first process complete to the state control circuit and the retry control circuit after outputting the first process instruction to a last first process procedure number determined in advance for every type of first process, causing the state control circuit to make a transition to a first process state upon receiving the exception detection notification, or upon judging by the judging circuit that the type of instruction requires the first process, or upon receiving the instruction to re-execute the first process from the retry control circuit, causing the state control circuit after making the transition to the first process state to notify the first process start to the procedure control circuit, the instruction circuit, and the retry control circuit, and make a transition from the first process state to return to a process state other than the first process state upon receiving notification of the first process complete from the instruction circuit, causing the judging circuit to notify the type of the first process to the second recording circuit, causing the second recording circuit to notify the recorded type to the instruction circuit and the retry control circuit, and causing the procedure control circuit to notify the first process procedure number after incrementing to the instruction circuit.

10. The method of controlling the processing device as claimed in claim 7, wherein the first process is one of an exception process, an exception return process, and an update process that updates a selection value of a stack pointer included in the programmable resources.

11. The method of controlling the processing device as claimed in claim 7, wherein the first process executed by the instruction execution circuit is an exception process, and the starting point of the first process is a point in time when a procedure to store an execution state at a time when an exception is generated in a first specified storage region included in the programmable resources, and simultaneously store a return destination of the exception indicated by a program counter included in the programmable resources in a second specified storage region included in the programmable resources, is completed.

12. The method of controlling the processing device as claimed in claim 7, wherein the first process executed by the instruction execution circuit is an exception return process, and the starting point of the first process is a point in time when a procedure to write a value of a first specified storage region included in the programmable resources to an execution state, and simultaneously write a value of a second specified storage region included in the programmable resources to a program counter included in the programmable resources, is completed.

13. The method of controlling the processing device as claimed in claim 7, wherein the first process executed by the instruction execution circuit is an update process that updates a selection value of a stack pointer included in the programmable resources, and the starting point of the first process is a point in time when a procedure to write a value specified by the instruction to a register included in the programmable resources, and simultaneously write a subsequent instruction address to a program counter included in the programmable resources, is completed.

* * * * *